United States Patent
Jilani et al.

(10) Patent No.: US 11,688,861 B2
(45) Date of Patent: Jun. 27, 2023

(54) BIPOLAR PLATE FOR FUEL CELLS, FUEL CELL STACK WITH SUCH BIPOLAR PLATES, AND VEHICLE WITH SUCH A FUEL CELL STACK

(71) Applicant: AUDI AG, Ingolstadt (DE)

(72) Inventors: Adel Jilani, Burnaby (CA); Sanjiv Kumar, Burnaby (CA); Radu P. Bradean, Burnaby (CA); Sebastian Voigt, Heilbronn (DE)

(73) Assignee: Audi AG, Ingolstadt (DE)

( * ) Notice: Subject to any disclaimer, the term of this patent is extended or adjusted under 35 U.S.C. 154(b) by 477 days.

(21) Appl. No.: 16/851,003

(22) Filed: Apr. 16, 2020

(65) Prior Publication Data

US 2020/0335803 A1    Oct. 22, 2020

(30) Foreign Application Priority Data

Apr. 17, 2019   (DE) ..................... 10 2019 205 564.8

(51) Int. Cl.
*H01M 8/0258* (2016.01)
*H01M 8/2483* (2016.01)
(Continued)

(52) U.S. Cl.
CPC ....... *H01M 8/0258* (2013.01); *H01M 8/0267* (2013.01); *H01M 8/04029* (2013.01);
(Continued)

(58) Field of Classification Search
None
See application file for complete search history.

(56) References Cited

U.S. PATENT DOCUMENTS

| 7,232,582 B2 | 6/2007 | Kikuchi et al. |
| 2003/0162078 A1 | 8/2003 | Kikuchi et al. |

FOREIGN PATENT DOCUMENTS

| DE | 103 28 039 A1 | 1/2005 |
| DE | 11 2006 003 413 T5 | 10/2008 |
| DE | 10 2016 121 506 A1 | 5/2018 |

OTHER PUBLICATIONS

DE 10328039 English translation obtained via Google Patents Jul. 19, 2022 (Year: 2012).*

* cited by examiner

*Primary Examiner* — Sarah A. Slifka
(74) *Attorney, Agent, or Firm* — Seed Intellectual Property Law Group LLP

(57) ABSTRACT

In order to provide a bipolar plate for a fuel cell, providing an anode plate with an anode side and a coolant side, wherein a first structuring for forming an anode flow field is formed on the anode side, and a cathode plate with a cathode side and a coolant side, wherein a second structuring for forming a cathode flow field is formed on the cathode side; wherein structural elements, which are contacted by the coolant sides of the anode plate and the cathode plate, for forming a coolant flow field, are arranged between the anode plate and the cathode plate, which bipolar plate has an optimized pressure distribution in a fuel cell stack and increased stability in comparison with the prior art, it is proposed that the structural elements may be made of an elastic material and that the structural elements have a different height in different regions of the coolant flow field. A fuel cell stack and a vehicle are also disclosed.

13 Claims, 5 Drawing Sheets

(51) Int. Cl.
*H01M 8/0267* (2016.01)
*H01M 8/04029* (2016.01)
*H01M 8/04701* (2016.01)

(52) U.S. Cl.
CPC ..... *H01M 8/04701* (2013.01); *H01M 8/2483* (2016.02); *H01M 2250/20* (2013.01)

BIPOLAR PLATE FOR FUEL CELLS, FUEL CELL STACK WITH SUCH BIPOLAR PLATES, AND VEHICLE WITH SUCH A FUEL CELL STACK

BACKGROUND

Technical Field

Embodiments of the invention relate to a bipolar plate for a fuel cell, comprising an anode plate with an anode side and a coolant side, wherein a first structuring for forming an anode flow field is formed on the anode side; a cathode plate with a cathode side and a coolant side, wherein a second structuring for forming a cathode flow field is formed on the cathode side; wherein structural elements are arranged between the anode plate and the cathode plate in order to form a coolant flow field. Embodiments of the invention also relate to a fuel cell stack with such bipolar plates and to a vehicle comprising such a fuel cell stack.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (in most cases proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Generally, the fuel cell is formed by a plurality of MEAs arranged in a stack, the electrical voltages of which MEAs add up. Between the individual membrane electrode assemblies, bipolar plates (also called flow-field plates or separator plates) are usually arranged, which ensure a supply of the individual cells with the operating media, i.e., the reactants, and are usually also used for cooling. In addition, the bipolar plates also ensure an electrically conductive contact to the membrane electrode assemblies.

During operation of the fuel cell, the fuel (anode operating medium), particularly hydrogen $H_2$ or a gas mixture containing hydrogen, is supplied via an open flow field of the bipolar plate on the anode side to the anode, where electrochemical oxidation of $H_2$ to protons $H^+$ with loss of electrons takes place ($H_2 \rightarrow 2H^+ + 2e^-$). Protons are transported (in a water-bound or water-free manner) from the anode chamber into the cathode chamber across the electrolyte or membrane that separates and electrically insulates the reaction chambers in a gastight manner from each other. The electrons provided at the anode are guided to the cathode via an electrical line. The cathode receives, as a cathode operating medium, oxygen or a gas mixture containing oxygen (such as air) via an open flow field of the bipolar plate on the cathode side so that a reduction of $O_2$ to $O^{2-}$ with a gain of electrons takes place ($\frac{1}{2}O_2 + 2e^- \rightarrow O^{2-}$). At the same time, the oxygen anions react in the cathode chamber with the protons transported across the membrane to form water ($O^{2-} + 2H^+ \rightarrow H_2O$).

The fuel cell stack is supplied with its operating media, that is the anode operating gas (hydrogen for example), the cathode operating gas (air for example), and the coolant by means of the main supply channels, which run through the stack in its entire stack direction and from which the operating media are supplied to the individual cells via the bipolar plates. There are at least two such main supply channels available for each operating medium, namely one for supplying and one for discharging the respective operating medium.

Bipolar plates typically consist of or include two interconnected half-plates, each of which is structured on both sides. Structurings for transporting the operating media are required on the sides facing away from one another and structurings for transporting coolant are required on the sides facing one another. The half-plates must be matched to one another in each case, since three separate transport paths have to be provided by means of two half-plates. This leads to further boundary conditions, which reduce the flexibility of the embodiments of the bipolar plates. In typical embodiments, the half-plates of known bipolar plates are profiled, wherein the profiles engage in one another or are nested.

At its opposite stack ends, the fuel cell stack typically has end plates, which are connected to one another by tensioning devices as part of a tensioning system. The tensioning devices transmit tensile forces which pull the end plates toward one another and press the individual cells arranged between them, that is, press them against each other. In addition, compression springs are part of the tensioning system in order to stress the stack uniformly and to avoid damage to the stack.

BRIEF SUMMARY

Embodiments of the invention are based on the object of providing a bipolar plate, which at least partially eliminates the disadvantages of a bipolar plate which it has in conjunction with compression springs.

This object is achieved by a bipolar plate, a fuel cell stack and a vehicle with such a fuel cell stack having features described herein.

The bipolar plate comprises an anode plate with an anode side and a coolant side, wherein a first structuring for forming an anode flow field is formed on an anode side. The bipolar plate furthermore comprises a cathode plate with a cathode side and a coolant side, wherein a second structuring for forming a cathode flow field is formed on the cathode side. Structural elements which contact the coolant sides of the anode plate and the cathode plate are arranged between the anode plate and the cathode plate to form a coolant flow field. The structural elements may be made of an elastic material and the structural elements may have different heights depending on in which region of the coolant flow field they are arranged.

The compressive stress of the bipolar plate or of the flow field(s) for the reactants and the coolant is not the same in all regions but differs, among other things, as a function of the geometric shape of the flow paths and their position relative to the inflow region or outflow region of the respective flow field.

In order to compensate for such differences, the structural elements of different heights are arranged in regions, wherein they have a higher height in regions with lower compressive stress than the structural elements in other regions with higher compressive stress.

A plurality of regions which can be provided with structural elements of different heights can be provided. This depends on the specific design of the respective bipolar plate.

Three regions may be provided, namely an inflow region, an outflow region and a transition region from the inflow region to the outflow region of the flow field, wherein the height of the structural elements increases from the inflow region to the outflow region.

Depending on their height, the structural elements contact the cathode plate and/or anode plate, wherein, in the installed state, the cathode plate and anode plate are contacted by all structural elements in a fuel cell stack, since the stack is braced.

Such structural elements serve as embedded springs in a fuel cell stack, among other things, for optimizing compression while at the same time increasing structural robustness.

In addition, the stack height of the fuel cell stack can thereby be reduced in comparison with the prior art, since the compression springs customarily used are dispensable. In addition, such compression springs according to the prior art do not provide good control of the contact pressure on the active surface of the bipolar plate, wherein the resulting non-uniform stack densification possibly leads to plate breakage. This is avoided by the bipolar plates described herein. In addition, weight can be saved by dispensing with compression springs. The deflection of the end plate is also minimized. In addition, it is particularly advantageous that the effects of the penetration by GDL/MEA can be minimized.

Furthermore, a cost reduction in the production of plates can be realized, for example by dispensing with the compression springs and by the possibility of using the mold-in-place (MIP) method for mass production.

Apart from the structural elements, the bipolar plate may consist of or be made of a conductive material, such as a carbon-based material, such as graphite or a composite material of graphite and carbon. The use of metal is also provided.

The structural elements may consist of or be made of an elastic, electrically conductive polymer which is stable in the temperature range of the fuel cell operation, wherein at least one structural element may be conductive.

All structural elements may consist of or be made of the same material so that, apart from the selection of the material, the spring properties of the structural elements are adjusted by their height.

The heights of the different structural elements result from the specific requirements in the respective region.

By way of example, a height of the structural elements of 440 μm, 420 μm and 400 μm and a width of 500 μm may be assumed with a height of the bipolar plate of 1140 μm and a height of the coolant flow field of 440 μm. The height of the first and second structurings is determined independently of the heights of the structural elements. Such heights may range from 125 μm to 225 μm.

Silicones or siloxanes may be used, wherein polydimethylsiloxane is one specific material option.

The polymer may have an electrical conductivity of >100 S/cm. An electrical resistor may be 0.0008 Ω-cm and the compression modulus may be 5 MPa.

The structural elements are arranged at a distance from one another between the anode plate and the cathode plate, such that the coolant can flow through the coolant flow field of the bipolar plate with the lowest possible pressure losses.

For this purpose, the structural elements are of columnar design, such as with a constant cross section over the entire length of the individual structural element or also with a cross section which varies over the length, for example with a reduced cross section in the middle of the structural elements.

The structural elements may have differently sized cross-sectional areas distributed over the surface of the bipolar plate, in order to meet different requirements for the spring force in different regions of the bipolar plate.

The structural elements may have a rectangular or square cross section, such that very simple production is possible. Round or oval cross sections with one or two axes of symmetry are also options.

According to some embodiments, the structurings of the anode plate and the cathode plate are designed in such a way that at least the contact surface of the structural elements on the respective other sides of anode plate and cathode plate is at least partially covered by the structurings in order to distribute the pressure over the entire stack height.

The first structuring of the anode side and the second structuring of the cathode plate and the structural elements are thus arranged one directly above the other in the stack direction of the bipolar plates. Damage to the bipolar plate can thus be avoided.

Additional spatial embodiments of the structurings of anode plate and cathode plate are easily possible for optimizing the flow conditions. An equivalent embodiment to that of the structural elements is one option.

The mixing of structural elements with different cross sections is also possible.

Forming flow regions, the structural elements can be arranged in the coolant flow field in a regular or irregular manner, in order to avoid pressure losses and to use the necessary spring force as required. The structural elements and, optionally, the structurings may form a grid pattern when they are arranged regularly.

The structural elements may be fixed to at least the anode plate or the cathode plate, for example by gluing, wherein a one-sided fixing can facilitate the mounting of the bipolar plates and is generally sufficient. Fixing with the cathode plate carrying the oxidizing agent is one option.

According to one embodiment, the structural elements are provided and arranged on at least one carrier plate. Such at least one carrier plate may consist of or be made of the same material as the structural elements and may be produced in one piece with the structural elements.

All structural elements can be arranged on a carrier plate or also on different carrier plates depending on the region, that is, all structural elements of one height are located on a separate carrier plate. The manufacturing outlay can thereby be reduced.

The carrier plate can be arranged to be adjacent either to the anode plate or to the cathode plate. This embodiment enables a substantially simplified mounting of the bipolar plate. With this embodiment as well, gluing to at least the anode plate and the cathode plate can be carried out analogously to individual structural elements.

Apart from the specifications described above, the flow fields of the anode plate and the cathode plate and the coolant flow field can be individually designed independently of one another.

A further aspect relates to a fuel cell stack comprising a stack between two end plates of alternately arranged membrane electrode assemblies and bipolar plates.

Some embodiments also relate to a vehicle that has a fuel cell system with a fuel cell stack as described herein. The vehicle may be an electric vehicle in which an electrical energy generated by the fuel cell system serves to supply an electric traction motor and/or a traction battery.

Aspects and features of the various embodiments mentioned herein may be combined with each other unless stated otherwise in individual cases.

BRIEF DESCRIPTION OF THE SEVERAL VIEWS OF THE DRAWINGS

Embodiments of the invention are explained below in reference to the respective drawings. The following is shown.

DETAILED DESCRIPTION

Figure 1:
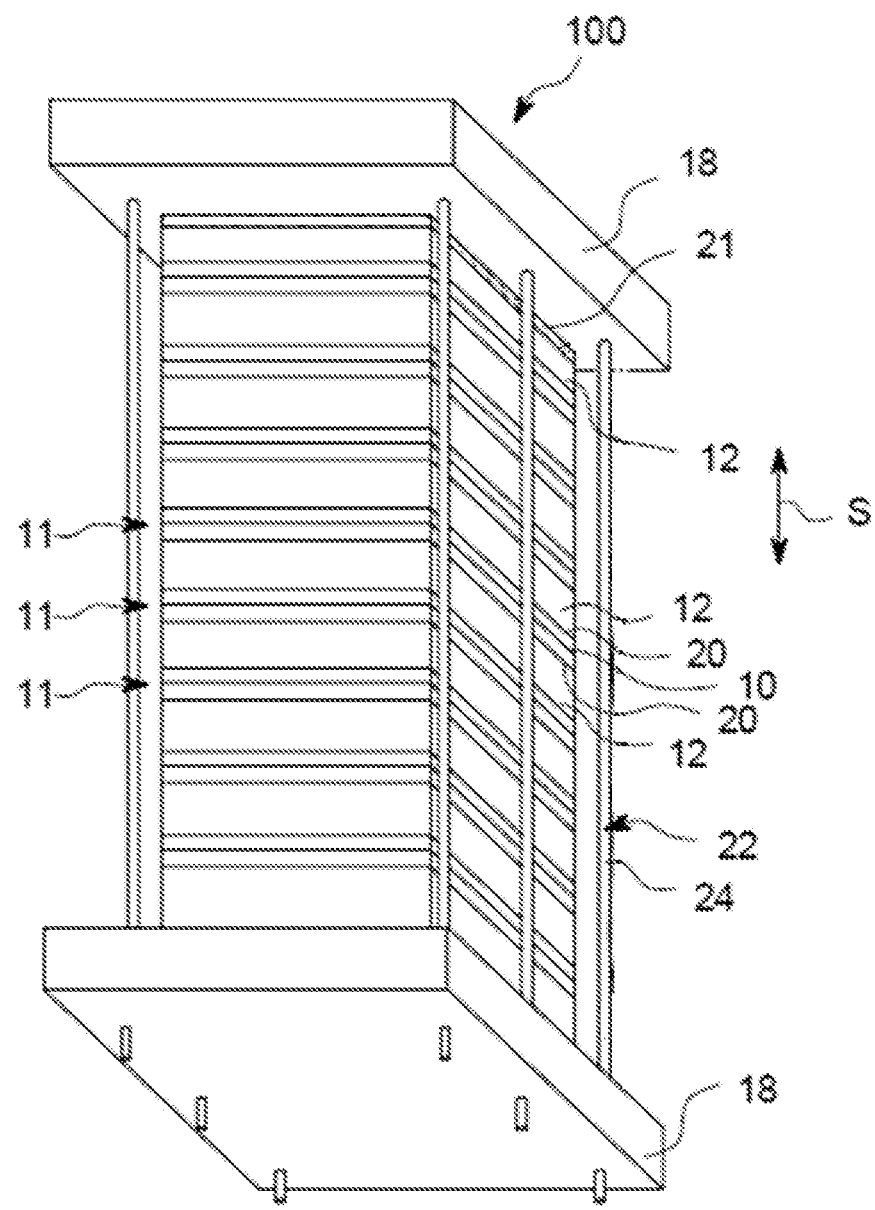
FIG. 1 is a schematic representation of a fuel cell stack.

FIG. 1 shows a schematic representation of a fuel cell stack, denoted overall by 100. The fuel cell stack 100 is part of a vehicle (not shown in more detail), in particular an electric vehicle, which has an electric traction motor, which is supplied with electrical energy by the fuel cell stack 100.

The fuel cell stack 100 comprises a plurality of membrane electrode assemblies 10 and bipolar plates 12 alternately arranged (stacked) next to each other on their flat sides. Overall, several stacked individual cells 11 thus form the fuel cell stack 100, wherein both one of the individual cells 11 and the fuel cell stack 100 can generally be called a fuel cell. The fuel cell stack 100 has end plates 18 on both end sides. Between the bipolar plates 12 and the respective membrane electrode assemblies 10, anode and cathode chambers (not shown) are arranged, which are delimited by circumferential seals 20. In order to produce the sealing function of the seals 20, among other things, the fuel cell stack 100 is pressed in the stack direction S by means of a tensioning system.

The tensioning system comprises an outer tensioning device 22 along with elastic structural elements which are not visible here and are arranged in the coolant region of the bipolar plates 12. These are described in more detail below.

In order to build external stress, which is transmitted to the structural elements in the fuel cell stack 100, elongated tensile bodies 24 of the outer tensioning devices 22 transfer tensile forces between the two end plates 18, such that the end plates 18 are pulled toward one another by means of the tensile bodies 24. To this end, the tensile bodies 24 extend in a stack direction S of the fuel cell stack 100.

Figure 2:
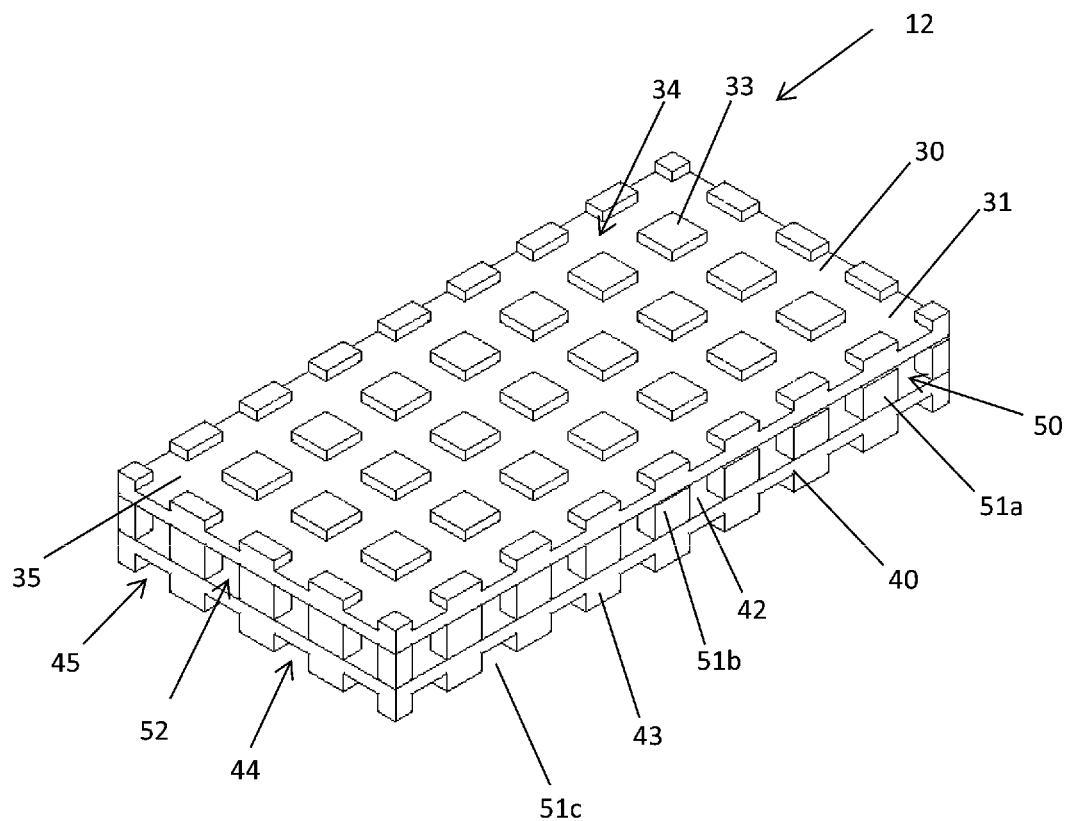
FIG. 2 is a perspective view of a detail of a bipolar plate.
Figure 3:
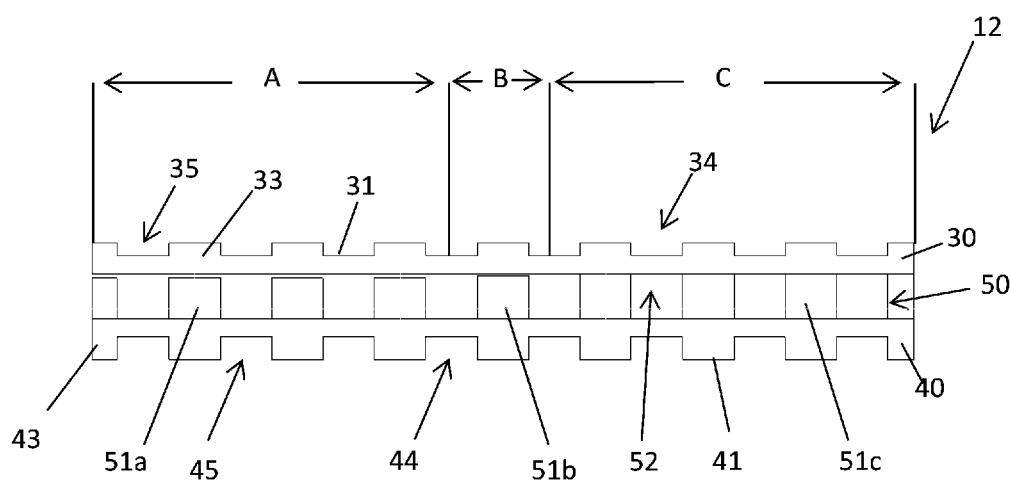
FIG. 3 is a sectional view of the detail of the bipolar plate according to FIG. 2.

FIGS. 2 and 3 show a bipolar plate 12 according to a first embodiment in different views. A detail of the bipolar plate 12 is shown in each case.

The bipolar plate 12 here comprises two individual plates, an anode plate 30 and a cathode plate 40. The anode plate 30 has an anode side 31 and a coolant side 32 facing the cathode plate 40. The cathode plate 40 has a cathode side 41 and a coolant side 42 facing the anode plate 30. In order to form a coolant flow field 50, elastic structural elements 51a, 51b, 51c which have a different height h are arranged between the anode plate 30 and the cathode plate 40 on the coolant side 32, 42 in each case. In the inflow region A for the coolant, the height h of the structural elements 51a is smaller than that of the structural elements 51c in the outflow region C, and the height h of the structural elements 51b in the transition region B is between those of the other structural elements 51a and 51c.

In the uninstalled state, only the structural elements 51c in the outflow region C contact the anode plate 30 and the cathode plate 40.

In the installed state, all structural elements 51a, 51b, 51c contact the anode plate 30 and the cathode plate 40, since the corresponding fuel cell stack 100 is braced so that there is compensation for a difference in height between the structural elements 51a, 51b, 51c.

The structural elements 51a, 51b, 51c are columnar and have a square cross section. They are distributed uniformly and thus form flow paths 52 in the form of a grid, through which a coolant can flow in the longitudinal and transverse directions relative to a main axis of the bipolar plate 12.

Figure 4:
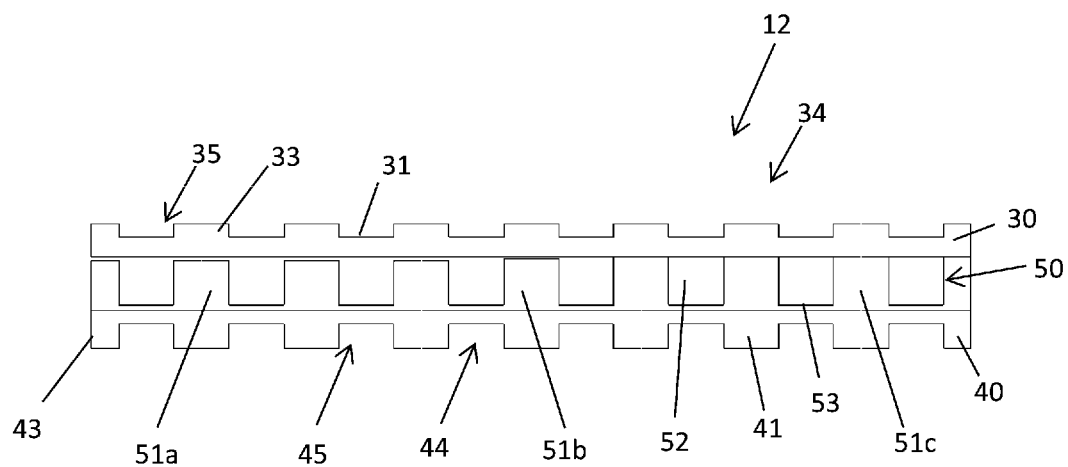
FIG. 4 is a sectional view of a detail of a bipolar plate.

On the anode side 31 and the cathode side 41 facing away from the coolant flow field 50, a first structuring 33 and a second structuring 43 respectively are provided, which are both designed analogously to the structural elements 51a, 51b, 51c of the coolant flow field 50 and form an anode flow field 34 and a cathode flow field 44. That is to say, they are columnar with a square cross section. In addition, they form flow paths 35, 45 for the two reaction media, wherein such flow paths in FIGS. 2 to 4 are congruent in the stack direction S with the structural elements 51a, 51b, 51c.

The deviating sizes of the structural elements 51a, 51b, 51c in the center of the cathode plate 40 in contrast to those at the edges are only attributed to the shown section of the bipolar plate 12 and have no technical significance. Of course, it is possible in principle to dimension the structural elements 51a, 51b, 51c differently and to distribute them unevenly. In order to facilitate the mounting of the bipolar plate 12, the structural elements 51a, 51b, 51c are fixed, such as glued, at least to the coolant side 42 of the cathode plate 40.

FIG. 4 again shows a detail of a bipolar plate 12 according to a second embodiment in section. With such embodiment, the structural elements 51a, 51b, 51c are integrally formed with a carrier plate 53, which rests with the flat side on the coolant side 42 of the cathode plate 40. The use of this carrier plate 53 significantly facilitates the mounting of the bipolar plate 12. With this variant as well, fixing can be carried out, for example, by gluing the carrier plate 53 or the structural elements 51a, 51b, 51c.

Figure 5:
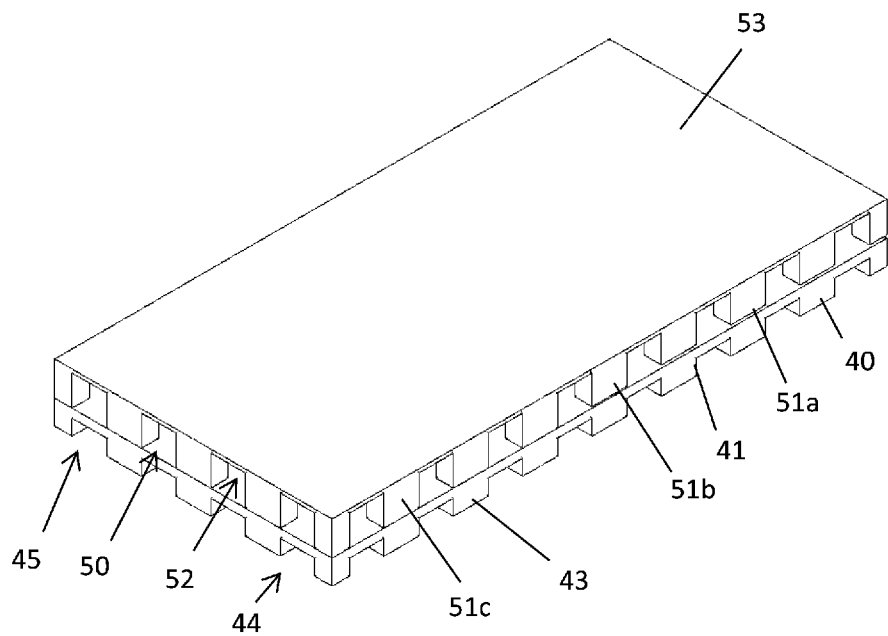
FIG. 5 is a perspective view of a detail of a cathode plate with structural elements arranged on a carrier plate.

The other variant with which the side of the carrier plate 53 carrying the structural elements 51a, 51b, 51c rests on the coolant side 42 of the cathode plate 40 is shown in FIG. 5. The anode plate 30, which is not shown, is applied to the cathode plate 40 after arranging the carrier plate 53 with the structural elements 51a, 51b, 51c, in order to complete the bipolar plate 12.

Figure 6:
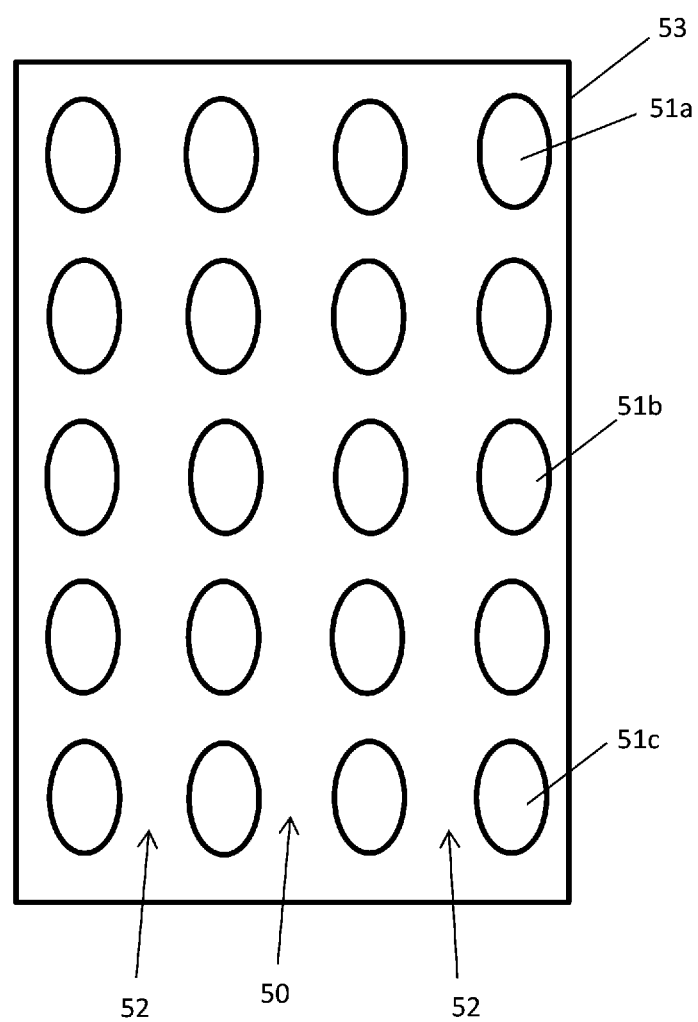
FIG. 6 is a plan view of structural elements with oval cross section on a carrier plate.
Figure 7:
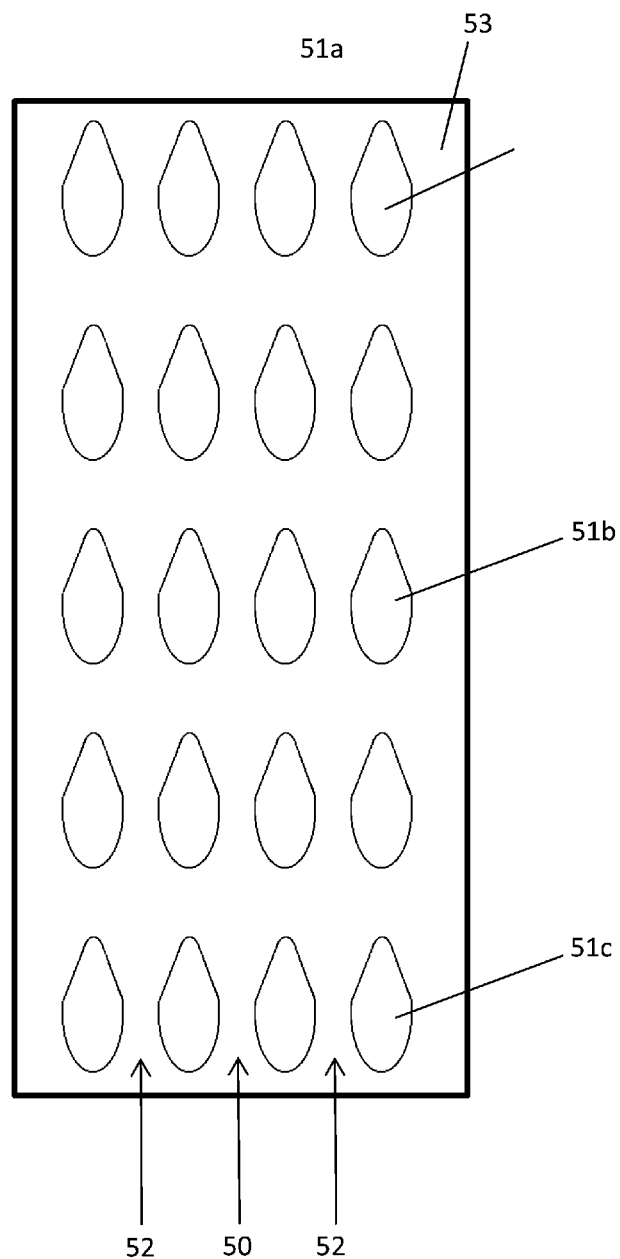
FIG. 7 is a plan view of structural elements with oval cross section on a carrier plate.

FIGS. 6 and 7 each show a carrier plate 53 with structural elements 51a, 51b, 51c applied thereto, such structural elements having an oval cross section with two axes of symmetry (FIG. 6) and a cross section with one axis of symmetry (FIG. 7). Such embodiments serve to optimize the flow conditions of a coolant. Such cross sections can also be selected as first structuring 33 and/or second structuring 43.

Unless explicitly stated, the statements equally relate to all embodiments.

This application claims priority to German patent application no. 10 2019 205 564.8, filed Apr. 17, 2019, which is hereby incorporated herein by reference in its entirety.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate for a fuel cell, comprising:
an anode plate with an anode side and a coolant side, wherein a first structuring for forming an anode flow field is formed on the anode side, and a cathode plate with a cathode side and a coolant side, wherein a second structuring for forming a cathode flow field is formed on the cathode side;
wherein structural elements are arranged between the anode plate and the cathode plate to form a coolant flow field, wherein the structural elements comprise an elastic material and the structural elements have different heights in different regions of the coolant flow field when the bipolar plate is in an uninstalled state.

2. The bipolar plate according to claim 1, wherein the height of the structural elements is inversely proportional to the compressive stress in the regions of the coolant flow field.

3. The bipolar plate according to claim 1, wherein the anode plate and the cathode plate comprise metal or a conductive carbon-based material.

4. The bipolar plate according to claim 1, wherein the structural elements comprise an elastic polymer, wherein at least one structural element is electrically conductive.

5. The bipolar plate according to claim 1, wherein the structural elements are columnar.

6. The bipolar plate according to claim 1, wherein the first structuring of the anode plate and the second structuring of the cathode plate are positioned one above the other in the stack direction and overlap at least partially with the cross-sectional area of the structural elements.

7. The bipolar plate according to claim 1, wherein the structural elements are arranged in a regular or irregular manner.

8. The bipolar plate according to claim 1, wherein the structural elements are fixed to at least the anode plate or the cathode plate, or the structural elements are formed on at least one carrier plate, which is arranged to be adjacent either to the anode plate or to the cathode plate, wherein the carrier plate can be fixed to the anode plate or the cathode plate.

9. The bipolar plate according to claim 3, wherein the anode plate and the cathode plate comprise graphite or a composite material of graphite and carbon.

10. The bipolar plate according to claim 5, wherein the structural elements have a rectangular or oval cross section.

11. The bipolar plate according to claim 5, wherein the structurings of the anode plate and/or the cathode plate are columnar.

12. A fuel cell system comprising a stack between two end plates, wherein the stack includes alternately arranged membrane electrode assemblies and bipolar plates, wherein each of the bipolar plates includes:
an anode plate with an anode side and a coolant side, wherein a first structuring for forming an anode flow field is formed on the anode side, and a cathode plate with a cathode side and a coolant side, wherein a second structuring for forming a cathode flow field is formed on the cathode side;
wherein structural elements are arranged between the anode plate and the cathode plate to form a coolant flow field, wherein the structural elements comprise an elastic material and the structural elements have different heights in different regions of the coolant flow field when the bipolar plate is in an uninstalled state.

13. A vehicle comprising a fuel cell system comprising a fuel cell stack between two end plates, wherein the stack includes alternately arranged membrane electrode assemblies and bipolar plates, wherein each of the bipolar plates includes:
an anode plate with an anode side and a coolant side, wherein a first structuring for forming an anode flow field is formed on the anode side, and a cathode plate with a cathode side and a coolant side, wherein a second structuring for forming a cathode flow field is formed on the cathode side;
wherein structural elements are arranged between the anode plate and the cathode plate to form a coolant flow field, wherein the structural elements comprise an elastic material and the structural elements have different heights in different regions of the coolant flow field when the bipolar plate is in an uninstalled state.

* * * * *